(12) United States Patent
Roudaut

(10) Patent No.: US 8,078,537 B2
(45) Date of Patent: Dec. 13, 2011

(54) COMPREHENSIVE INSURANCE PRODUCT WITH LOSS COVERAGE AND ASSISTANCE SERVICES

(75) Inventor: Dominique Roudaut, Jersey City, NJ (US)

(73) Assignee: American International Group, Inc., New York, NY (US)

( * ) Notice: Subject to any disclaimer, the term of this patent is extended or adjusted under 35 U.S.C. 154(b) by 320 days.

(21) Appl. No.: 12/147,344

(22) Filed: Jun. 26, 2008

(65) Prior Publication Data

US 2009/0326987 A1     Dec. 31, 2009

(51) Int. Cl.
*G06Q 40/00*     (2006.01)

(52) U.S. Cl. ............................................ 705/40; 705/30

(58) Field of Classification Search ................ 705/10–44
See application file for complete search history.

(56) References Cited

U.S. PATENT DOCUMENTS

| | | | |
|---|---|---|---|
| 4,831,526 A * | 5/1989 | Luchs et al. ...................... | 705/4 |
| 5,819,230 A * | 10/1998 | Christie et al. .................... | 705/4 |
| 6,456,979 B1 * | 9/2002 | Flagg ................................. | 705/4 |
| 6,604,080 B1 * | 8/2003 | Kern ................................. | 705/4 |
| 7,324,950 B2 | 1/2008 | Sherman | |
| 7,330,820 B1 * | 2/2008 | Heyne et al. ...................... | 705/4 |
| 7,333,939 B1 * | 2/2008 | Stender et al. .................... | 705/4 |
| 7,337,122 B2 | 2/2008 | Eydeland et al. | |
| 7,346,524 B2 * | 3/2008 | Goux ................................. | 705/4 |
| 7,346,525 B1 | 3/2008 | Milanovich | |
| 7,379,000 B2 | 5/2008 | Sherman | |
| 7,613,620 B2 * | 11/2009 | Salwan ............................. | 705/2 |
| 2008/0147447 A1 * | 6/2008 | Roche et al. ...................... | 705/4 |

* cited by examiner

*Primary Examiner* — Frantzy Poinvil
(74) *Attorney, Agent, or Firm* — Leydig, Voit & Mayer, Ltd.

(57) ABSTRACT

Aspects of the disclosure describe systems and methods for providing a combined insurance and assistance product to an insured. Insurance coverage can be provided to the insured for at least one insured loss event in conjunction with assistance services coverage based upon the at least one insured loss event. A base premium for the combined insurance and assistance product can be calculated based at least in part on a premium for the insurance coverage and a premium for the assistance services coverage. Assistance services can include preventive services directed to helping avoid the occurrence of at least one insured loss event and/or rehabilitative services directed to providing assistance after an occurrence of at least one insured loss event.

17 Claims, 5 Drawing Sheets

Providing an Insurance Product Infrastructure

Providing an Insurance Product Infrastructure

Providing an Insurance Product Infrastructure

COMPREHENSIVE INSURANCE PRODUCT WITH LOSS COVERAGE AND ASSISTANCE SERVICES

FIELD OF THE INVENTION

The invention relates generally to systems and methods for providing insurance products, and more particularly, to systems and methods for providing comprehensive insurance products with loss coverage and assistance services.

BACKGROUND OF THE INVENTION

Traditionally, insurance companies provide client corporations such as those that operate hotels and theaters, for example, insurance coverage against accidental death and injury for its employees or customers. These insurance products are marketed to Risk Managers of the client corporations. These insurance products provide only monetary relief to accidental death or injury victims and their families and are not designed to support a proactive human resources and crisis management strategy or response.

Accident victims and their families may incur substantial costs for assistance services, such as psychological counselling and physical therapy. Client corporations can have increased costs after an accidental death or injury occurs on their premises. These costs may include increased insurance premiums, loss of productivity, investigation costs to determine the cause of the accident, and liability costs. In addition to these costs, publicity of any accident, injury or suicide can taint a client corporation's image and may adversely impact the volume of sales and the capacity of a client corporation to retain and hire personnel.

There is a need to alleviate the costs incurred by accident victims and their families. There is also need to prevent potential accident and injury on client corporation premises to decrease costs and loss of productivity. Further, there is a need to efficiently deal with the crises of any accident, injury and work-related suicide to maintain a positive and productive work environment. In addition, there is a need to enhance the public image of a client corporation due to an accident and injury or a work-related suicide. Further, there is a need to meet expectations regarding safety and health at work for an increasingly elder working population more sensitive to health and accident issues.

BRIEF SUMMARY OF THE INVENTION

Aspects of the disclosure describe an insurance product that includes assistance programs to prevent or manage accidental death and injuries on client corporation premises or mitigate its consequences. In one arrangement, assistance programs can be separated in two general categories: (1) Preventive and (2) Rehabilitative. Each general assistance program category can be further divided into programs geared to either assisting victims (and their families) or managing client corporations. Preventive programs, such as safety inspections, can be targeted to the client corporation premises to help prevent employee and visitor accidents and/or injuries in the future. Other preventive programs may include stress management and psychological counselling for client corporation employees. Mitigation programs can include crises management and public image enhancement of the client corporation. Other rehabilitative programs can include physical therapy and new job placement of employees.

In one aspect, this disclosure describes a method of providing an insurance product by an insurance company to a client corporation that comprises providing insurance coverage on insured incidents to the client corporation wherein the insurance coverage is determined using actuarial and heuristic techniques implemented by at least one software application. The method further comprises providing assistance services to one or more incident victims and to the client corporation wherein particular assistance services to include in the insurance product are determined using statistical analysis implemented by at least one software application.

In another aspect, the disclosure further describes a system of providing an insurance product by an insurance company to a client corporation that comprises an insurance policy that provides insurance coverage on insured incidents to the client corporation, and assistance services to one or more incident victims and to the client corporation. The system further comprises one or more servers that implement one or more software applications that provide the insurance product infrastructure, perform the underwriting process, and provide the client-specific insurance policy. The system further comprises one or more databases that store insurance product data comprising of statistical data, assistance service cost information and information requests. The system further comprises one or more electronic user interfaces to access the one or more software applications and the one or more databases. The system further comprises one or more communication networks that provide communication between the one or more servers, one or more software applications, and one or more databases.

BRIEF DESCRIPTION OF THE SEVERAL VIEWS OF THE DRAWING(S)

DETAILED DESCRIPTION OF THE INVENTION

Figure 1:
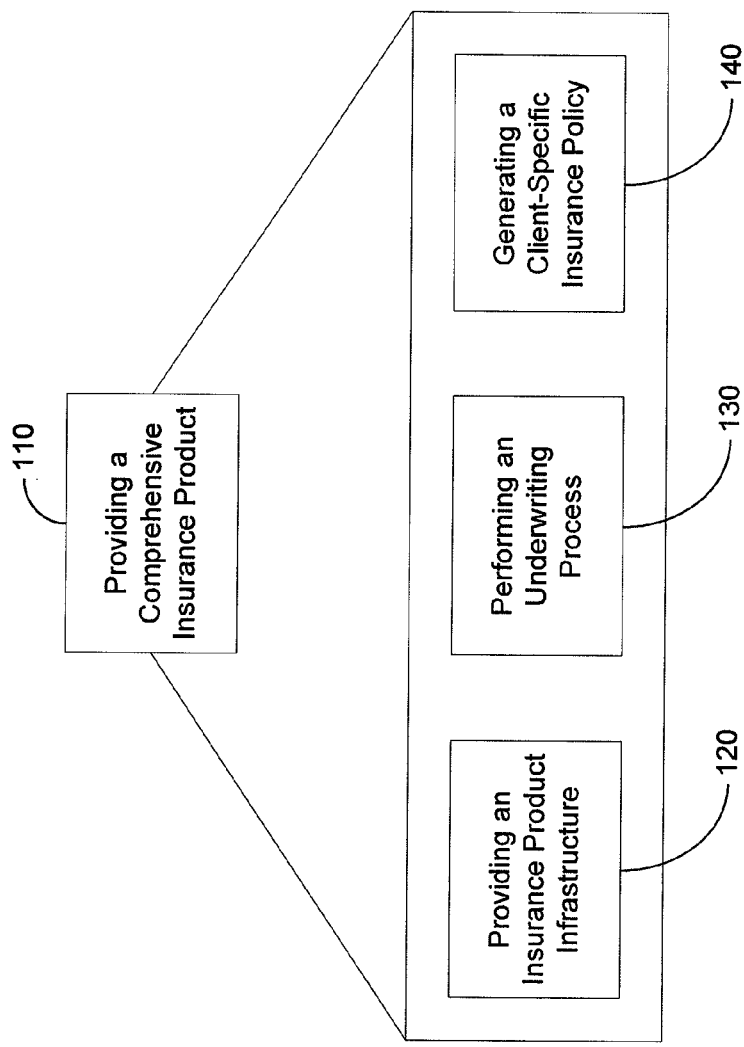
FIG. 1 is a block diagram of an embodiment of a method for providing a comprehensive insurance product.

Aspects of the disclosure describe a product for a client corporation that provides insurance coverage (e.g., accidental death and personal injury (ADPI), property, etc.) and assistances services for the victim and his family in a comprehensive care fashion and the client corporation when a covered event occurs. Other aspects of the disclosure can provide a corporate social responsibility mindset aimed at supporting the corporate social responsibility strategy of a client corporation relating to its employees and visitors such as clients, guests, providers, or anyone on the premises, for example. Aspects of the disclosure describe an insurance product with human resource and corporate image enhancing services. Human resource and corporate image enhancement services may be described collectively as assistance services. ADPI insurance can provide insurance coverage for a client corporation against accidents suffered by their employees or visitors on corporate premises on a 24-hour basis. Depending on the severity of the injury, victims of accidents may need human resource services (e.g., psychological counselling, physical therapy, etc.). In addition, a client corporation may need crisis management services (e.g., corporate image enhancement, accident investigation, media management, etc.).

Assistance programs that can be included in an insurance product with assistance services can be separated into two general categories: (1) Preventive and (2) Rehabilitative. That is a set of services can be included to help prevent any accident on client corporation premises and a set of services can be included to help rehabilitate the victims and the client corporation from the effects of an accident. Each general category of services may be further divided into programs geared to assisting victims (and their families) or managing a client corporation. Human resource services can be targeted toward assisting accident victims and their families, while corporate image enhancement services can be geared toward assisting a client corporation.

Preventative human resource services that are targeted to potential accident victims (e.g., employees, corporate visitors, etc.) may include psychological counselling and stress management workshops. For example, assembly line employees that work in a client corporation's factory may need psychological counselling or stress management skills to cope with the hardships of their job. Providing psychological counselling and stress management skills to these employees may prevent accidents on corporate premises.

Preventative services geared toward a client corporation may include safety inspections of factory manufacturing lines and providing employees with safety training and safety procedure documentation. These services can help prevent accidents from occurring on a client corporation's premises. Thus, aspects of the disclosure relate to an insurance product that provides not only ADPI (or some other type of injury or accident insurance) but also preventative assistance services for a client corporation, its employees, and its customers to prevent a covered loss event.

Aspects of the disclosure describe an insurance product that not only pays a client corporation on its accident claim but also provides rehabilitative assistance services for a client corporation and accident victims (e.g., corporate employees, corporate visitors, etc.). Rehabilitative services that are targeted to accident victims and their families may include psychological counselling, physical therapy, job training and placement, and valet services. For example, an accident victim may have suffered a personal injury traumatic enough to require psychological counselling and physical therapy. Further, an employee may suffer a personal injury that is too severe for the employee to continue in her current job within the client corporation. For example, a factory worker that needs high manual dexterity to manufacture certain products suffers a severe hand injury that reduces her dexterity and leaves her incapable of performing her job. The insurance product can include a rehabilitative services feature that provides new job training and placement within the client corporation (or outside it) to continue leading a productive life after suffering the accident. In addition, employee accident victims may suffer disabling injuries such that during their recovery they are unable to perform many basic sustaining activities. The insurance product can include a rehabilitative service feature that provides valet services such as housekeeping, grocery delivery, and laundering services.

Rehabilitative services that are geared toward a client corporation may include public relations services that improve the corporate image due to the publicity of an accident on client corporate premises. For example, an accident or work-related suicide may occur in a car manufacturing plant. Customer reaction may be to boycott purchasing the car manufacturer's vehicles, while employee reaction may be to strike in protest of unsafe, stressful working conditions. The insurance product can include rehabilitative services that improve the car manufacturer's corporate image with customers and/or employees after such a work-related event to temper customer and employee reaction. The insurance product can provide other rehabilitative services such as, accident investigation and corporate management services, for example. Corporate management services may analyze the loss of productivity due to the accident and propose alternative corporate conditions to prevent future accidents while still maintaining high corporate productivity and limiting costs due to absenteeism.

Crisis management services are still another set of rehabilitative services that can help an insured respond to a widespread accident (e.g., fire, gas leak, terrorist attack, collapse, etc.). For example, a fire may affect hundreds of employees. Crisis management services can provide a client corporation with services such as locating employees, contacting their families, establishing emergency healthcare, fielding media information requests and interviews, coordinating emergency personnel, and securing corporate property.

Embodiments of the disclosure not only provide an insurance product with assistance services to client corporation employees but also to client corporation visitors. For example, in the case of a client corporation that is a movie theater, hotel, or restaurant chain, an insurance product with assistance services would provide ADPI insurance coverage and assistance services to not only its employees but also its customers in case of an accident occurring on corporate premises.

FIG. 1 is a block diagram of an embodiment of a method for providing a comprehensive insurance product 110. Components for providing the insurance product 110 can include providing an insurance product infrastructure 120, performing an underwriting process 130, and generating a client-specific insurance policy 140 for the insured client.

Providing the insurance product infrastructure can promote an efficient means to underwrite and generate an insurance policy for a specific client corporation. Exemplary steps in providing the insurance product infrastructure include selecting at least one insured loss event, selecting one or more assistance services, and calculating a base premium for the comprehensive product. Providing an insurance product infrastructure may include developing re-useable processes and forms for the insurance product that are used while performing the underwriting process and generating a client-specific insurance policy. Forms may include, but are not limited to, information requests that are sent to client corporations and a generic insurance policy that is customizable to a particular client. A re-usable process may include, but is not limited to, a methodology for analyzing the responses to the information requests to assess the client-specific risks found during the underwriting process. Statistical data can be gathered and analyzed to determine the accident frequency, severity, and workplace conditions. The insurance company can develop relationships with assistance service providers and negotiate a price for their services based on its statistical analysis of loss events. The insurance company can implement a methodology to calculate a base premium for the insurance product. This base premium can be adjusted during the underwriting process.

Performing an underwriting process 130 may include issuing information requests to the proposed insured, analyzing the responses to information requests, and assessing the client-specific risks according to the methodologies developed when providing the insurance product infrastructure 120. This can include finding load factors that quantify the client-specific risks and defining exclusions from coverage. The insurance company may adjust a base premium by each load factor.

The client-specific insurance policy can be generated to include the adjusted base premium found during the underwriting process. Further, an insurance company may modify the generic form of the insurance policy to exclude high-risk loss events from the insurance coverage. In addition, the insurance company may modify the generic form of the insurance policy in other ways to properly assess the client-specific risks (e.g., cover only a subset of client sites, subset of work force, etc.).

Figure 2:
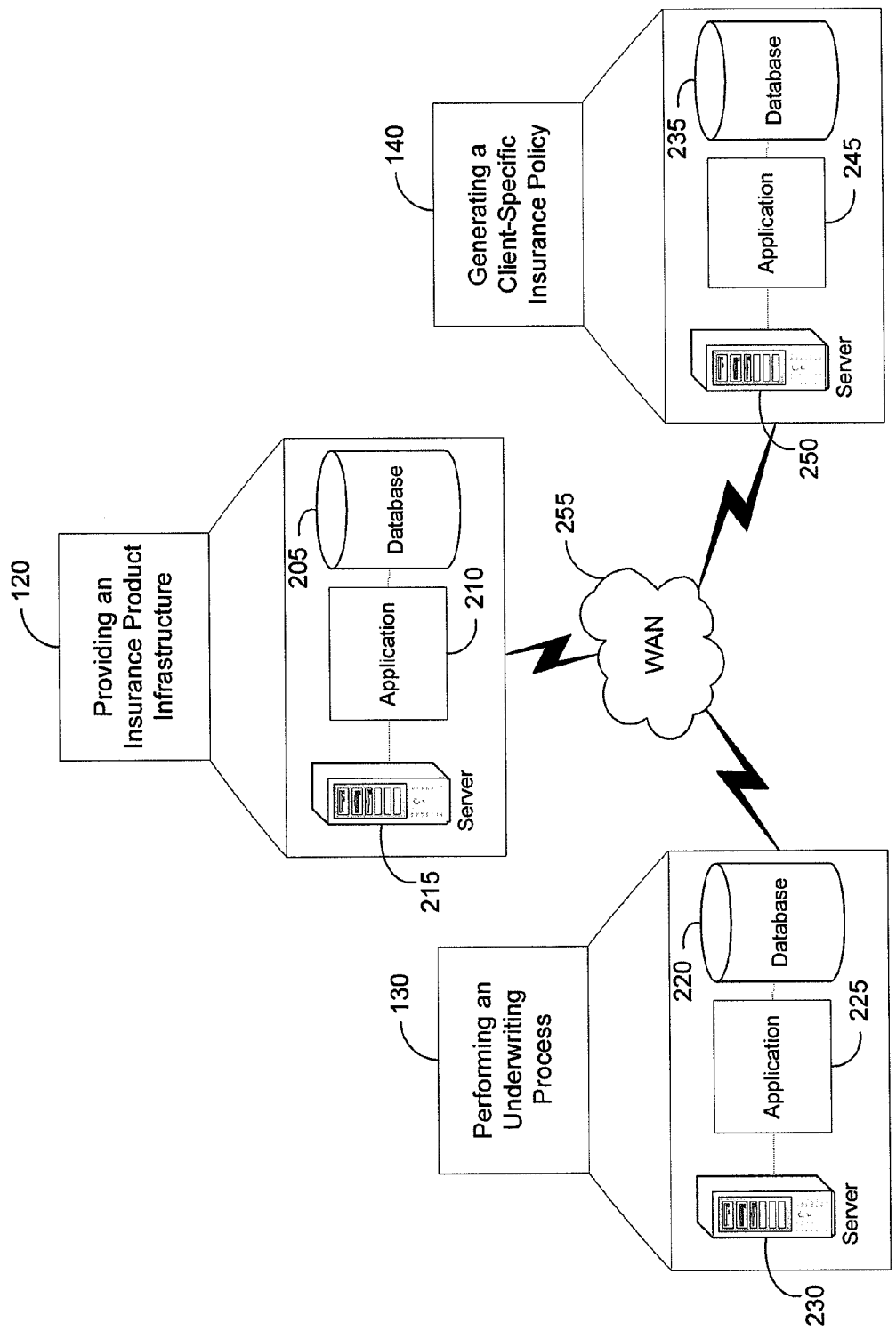
FIG. 2 shows a general architectural overview of an embodiment of a system for performing a method of providing a comprehensive insurance product.

FIG. 2 shows a general architectural overview of a system for performing a method of providing an insurance product. Each component shown in FIG. 1 (120, 130, and 140) may be implemented or performed using the technological arts, such as by using computer technology, including servers (215, 230, and 250), software applications (210, 225, and 245) and electronic databases (205, 220, and 235).

As discussed when describing FIG. 1, providing an insurance product infrastructure can include developing re-useable processes and forms for the insurance product that are used while performing the underwriting process and generating a client-specific insurance policy. An insurance company can use one or more software applications 210 to download and analyze statistical data to determine accident frequency, severity, and workplace conditions and store the statistical data and analysis in one or more databases 205. Further, the insurance company can use software applications 210 to provide exemplary information requests and store them in one or more databases 205. In addition, the insurance company can use one or more servers 215 to implement methodologies to analyze client responses to information requests, assess client-specific risks, and calculate a base premium. Further, the insurance company can use one or more databases to store cost information for selected assistance services that are used in calculating the base premium of the insurance product.

During the underwriting process, an insurance company may access information requests from one or more infrastructure databases 205 across a wide area network (WAN) 255 to send to a client corporation. Further, the insurance company can store the responses to the information requests in one or more databases 220. In addition, the insurance company can use one or more software applications 225 implemented by one or more servers 230 that analyze the responses to the information requests and asses the client-specific risks according to the methodologies developed when providing the insurance product infrastructure 120. This can include quantifying load factors and adjusting a base premium by each load factor using one or more software applications 225.

An insurance company can generate a client-specific insurance policy based on the client-specific risks found during the underwriting process. An insurance company can use one or more software applications 140 to access a form of a base insurance policy from one or more databases within the insurance product infrastructure 205 across a WAN 255. The insurance company can use other software applications 245 implemented by one or more servers 250 to assess the client-specific risks. After assessing the client-specific risks, the insurance company can use one or more software applications 245 to modify the base insurance policy to exclude high-risk loss events, cover only a subset of client sites, cover only a subset of the client's work force, etc.

Figure 3A:
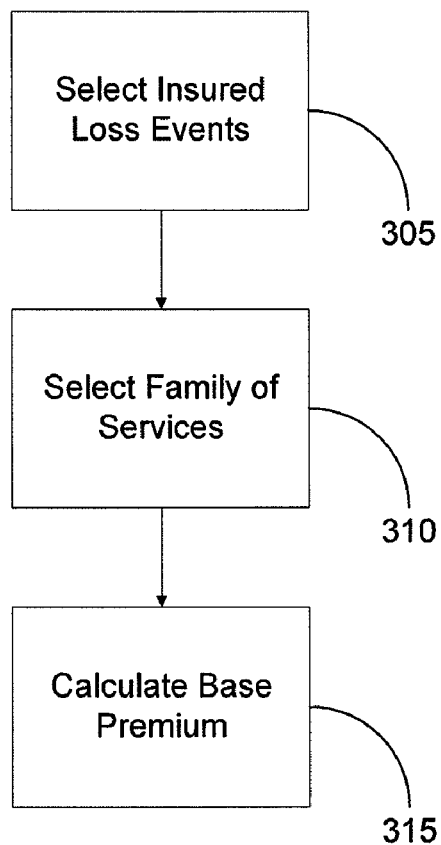
FIGS. 3A and 3B are flow diagrams each illustrating an embodiment of a step of providing an insurance product infrastructure.
Figure 3B:
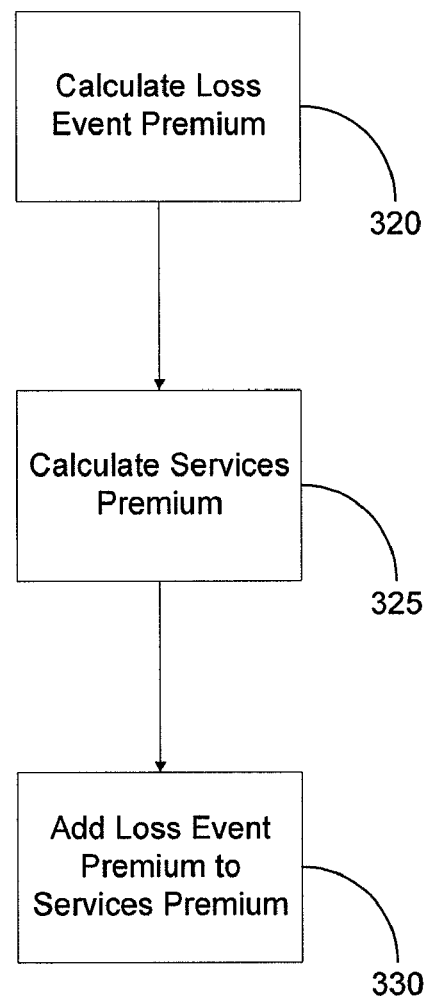

FIGS. 3A and 3B are flow diagrams each illustrating an embodiment of a step of providing an insurance product infrastructure. The insurance product comprises insurance coverage for loss events and assistance services. FIG. 3A shows a set of exemplary steps in calculating a base premium for an insurance product. At a step 305, an insurance company can select the insured loss events to be included in the insurance product. The insurance company can gather and analyze statistical information to determine the types of loss events to cover in the insurance product using actuarial techniques. Statistical information may be stored in electronic databases and software applications may perform the analysis to select the type of loss events to be included in the insurance product. At a step 310, an insurance company can select a family of services to be included in the insurance product. An insurance company may gather statistical data from government agencies (Department of Labor, Social Security Administration, etc.) to store in an electronic database (see FIG. 2) to show the number of loss events (e.g., accidental deaths, personal injuries, etc.) in each year nationwide. Thereafter, the insurance company can analyze the data using software applications (See FIG. 2) to select the family of assistance services to be included in the insurance product. These assistance services can either prevent the covered loss events or rehabilitate the victims and/or client corporation that have suffered the loss event. At a step 315, an insurance company can calculate the base premium for the insurance product. A base premium may be calculated by adding a loss event premium and a services premium as shown and discussed in FIG. 3B.

The method depicted in FIG. 3B shows a set of exemplary steps in providing an insurance product infrastructure. At a step 320, an insurance company calculates a loss event premium for the insurance product using actuarial techniques. This includes an insurance company selecting a set of loss events to be covered by the insurance product (See FIG. 3A). Further, the insurance company selects insurance coverage to pay for each loss event using actuarial and heuristic analysis. In addition, the insurance company selects a Target Loss Ratio (TLR) to take into account costs for overhead, commission to brokers, and profits margin. Using historical statistics that indicate the average number of loss events for the client corporation and the TLR, the insurance company calculates the loss event premium. At a step 325, an insurance company calculates a services premium for the insurance product using actuarial and heuristic techniques. After selecting the assistance services, the insurance company develops relationships with assistance service providers and determines the average costs for the services based on statistical information. Further, the insurance selects a TLR and uses the historical statistics to determine the average number of loss events that require assistance services. Thereafter, the insurance company calculates a premium for the services using the TLR and the cost of the assistance services. In some embodiments, the TLR selected for the insurance coverage can be different than the TLR selected for the assistance services. At a step 330, the insurance company calculates a base premium for the insurance product by adding the premium for the loss events to the premium for the assistance services.

Figure 4:
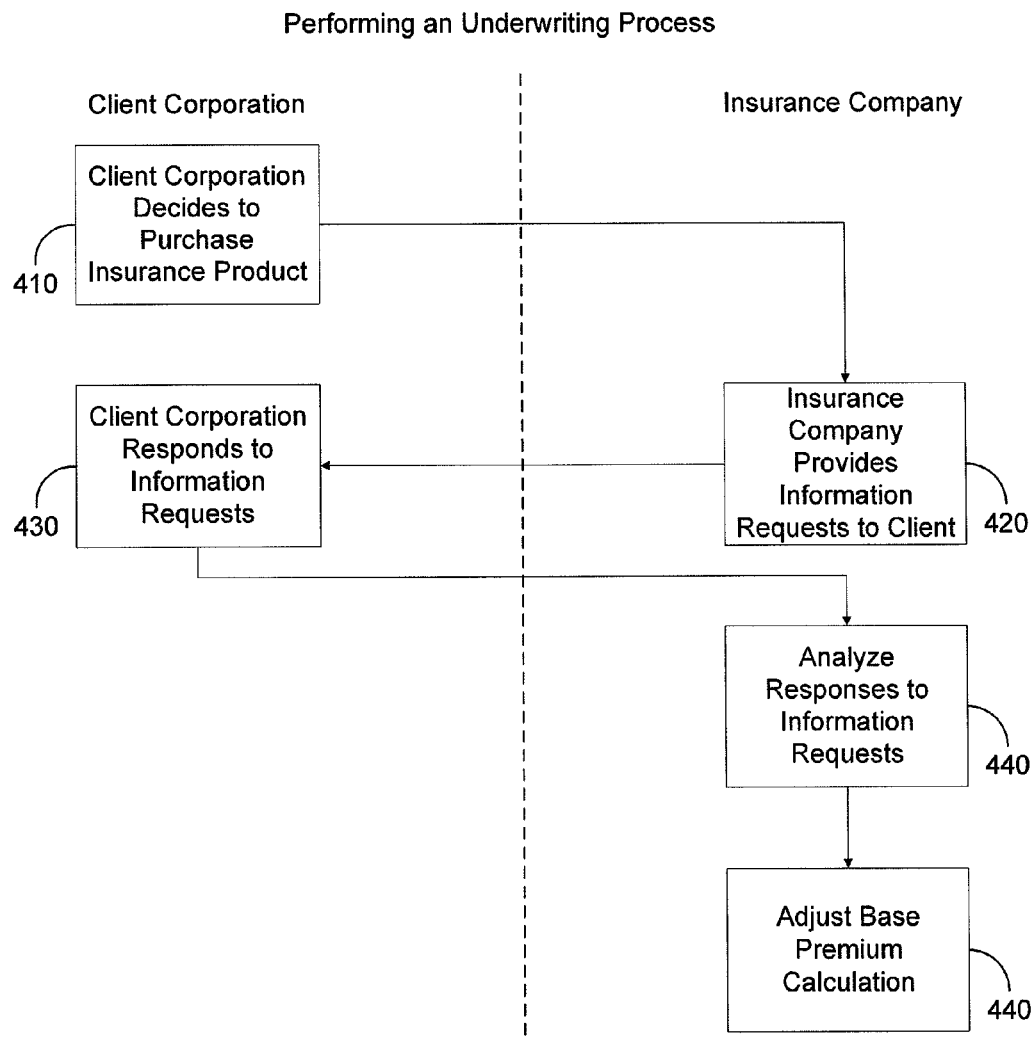
FIG. 4 is a flow diagram that illustrates an embodiment of a step of performing an underwriting process.

FIG. 4 is a flow diagram that illustrates an embodiment of a step of performing an underwriting process. At a step 410, a client corporation decides to purchase an insurance product with assistance services. At a step 420, an insurance company provides information requests to the client corporation to initiate the underwriting process for an insurance coverage. The information requests are stored in one or more electronic databases as part of the insurance product infrastructure. The information requests can contain queries to a client corporation for documentation, internal procedures, and other information so that an insurance company can assess its risk during the underwriting process. At a step 430, a client corporation responds to the information requests. At a step 440, an insurance company analyzes the responses to the information requests using the methodologies developed when providing the insurance product infrastructure to determine the client-specific risks. The insurance company may quantify the risks as load factors to be multiplied to the base premium of the insurance product. At a step 440, an insurance company adjusts a base premium for an insurance product based on the load factors found during its risk analysis of the information requests.

The following examples further illustrate principles and features of the comprehensive insurance product but should not be construed as limiting in any way.

EXAMPLE 1

Example 1 demonstrates the calculation of a loss event premium. Statistical information may show that a car manufacturer that have a large blue collar work force working in several factories have a high risk for accidental death and personal injury to their employees and property damage (e.g., due to fire) to their factories. Thus, an insurance company may select accidental death and personal injury as loss events to be covered by the insurance product. Historically an insurance company may provide an ADPI insurance coverage of $150,000 per loss event (e.g. accident, personal injury, etc.) for a company of 10,000 employees. Historical statistics may further show that on average 8 of the 10,000 suffers accidental death or personal injury each year. Consequently, the insurance company charges a client corporation a premium for each employee equal to $150,000×8/10,000=$120 for ADPI insurance.

EXAMPLE 2

Example 2 demonstrates the calculation of a services premium. Using statistical data from government agencies (Department of Labor, Social Security Administration, etc.), an insurance company gathers data of the number of accidental deaths and personal injuries in each year nationwide. Analyzing the statistical data, an insurance company selects a set of services to provide with ADPI insurance. Statistical data may show that 12 out of every 10,000 people suffer personal injury that may require physical therapy and psychological counselling. Further, 3 out of every people suffer accidental death that would require psychological counselling for victims' families. In addition, a client corporation may require crisis management services for each accidental death or injury. Thus, an insurance company may offer a client corporation and its employees psychological counselling, physical therapy, and crisis management services when offering ADPI insurance. An insurance company polls and gathers price information from several companies that provide different assistance services such as psychological counselling, physical therapy, and crisis management. Further, the severity of a personal injury may determine whether certain assistance services are provided. Using health care standards, when a victim is assessed to have certain amount of disability, then they are provided certain assistance programs. For example, if a personal injury is determined to disable a person by only 0-10% then no services are provided to the victim. However, if the victim is disabled by more than 10%, then an insurance company may provide the victim with physical therapy services. In addition, if the victim is disabled by more than 33%, the insurance company may consider the injury traumatic enough to offer the victim psychological counselling. In the case of accidental death (100% disabling), the victim's families would also be offered psychological counselling and assistance to deal with all administrative tasks (notaries, banks, heirs, etc.). Continuing with Example 2, an insurance company may offer crisis management services to the client corporation for every case of accidental death or personal injury. Crisis management services may coordinate the psychological and physical therapy services of the victims.

Table 1 shows further details in calculating the services premium in Example 2. Based on statistical data, an insurance company may find that 3 out of every 10,000 people suffer from accidental death and 12 out of every 10,000 people suffer personal injury. Of the 3 accidental deaths, the insurance company provides psychological counselling services for the victims' families. In addition, on average, 5 out of the 12 personal injuries are traumatic enough (over 33% disabling) such that an insurance company provides psychological counselling to the victims. Consequently, 8 victims or their families would require psychological services. In addition, Example 2 in Table 1 shows that there are 8 victims of personal injury and that all 8 are more than 10% disabling. Thus, all 8 personal injury victims would be offered physical therapy services. Further, the client corporation would require crisis management services for all 15 instances of accidental death and personal injury.

Continuing through Example 2 shown in Table 1, assistance services companies may quote the cost per victims for each service to the insurance company. The cost for psychological, physical therapy, and crisis management services per victims may be $5,000, $10,000, and $8,000, respectively. Because an insurance company expects 8 victims requiring psychological services (on average) for a company of 10,000 employees, the total cost for psychological services would be $5,000×8=$40,000. Similarly, the total cost for physical therapy and crisis management services may be $80,000 and $120,000, respectively. An insurance company would divide the total cost for each service by the average number of employees (10,000) to determine the cost per employee. Thus, the cost per employee for psychological counselling, physical therapy, and crisis management services is $4, $8, and $12, respectively. The cost for all services per employee would then be $24. An insurance company then selects a Target Loss Ratio (TLR) to determine a premium per employee. The premium per employee is found by dividing the cost for all services per employee by the TLR. In Example 2, TLR is equal to 66%. Thus, the premium per employee for an insurance company to provide the three assistance service would be $24/66%=$36. TLR takes into account the commission paid to brokers and overhead needed to establish the insurance product. In Example 2, the overhead and commissions each may be equal to 10%. The profit made from the premium per employee would then be calculated as equal to Profit=100%−TLR−Commision−Overhead=14%.

TABLE 1

|  | Average Number Per Year out of 10,000 | Number Requiring Psychological Services (Injury over 33% Disabling) | Number Requiring Physical Therapy (Injury over 10% Disabling) | Number Requiring Crisis Management |
|---|---|---|---|---|
| Accidental Death | 3 | 3 | 0 | 3 |
| Personal Injury | 12 | 5 | 8 | 12 |
| Average Number Requiring Assistance Services | NA | 8 | 8 | 15 |
| Average Service Cost per Victim | NA | $5,000 | $10,000 | $8,000 |
| Total Service Cost | NA | $40,000 | $80,000 | $120,000 |
| Cost for Each Service per Victim | NA | $4 | $8 | $12 |
| Total Cost for Services |  |  | $24 |  |
| Total Loss Ratio |  |  | 66% |  |
| Premium for Services |  |  | $36 |  |

Thus, Example 2 shown Table 1 calculates a services premium. Adding the ADPI premium found in Example 1 ($120) to the premium for assistance services ($36) found in Example 2 results in a base premium for the insurance product of $156.

EXAMPLE 3

Example 3 demonstrates illustrative Responses to an Information Request. Information Requests may be organized into different categories. For example, Table 2 shows that an Information Request may be organized into five categories, namely activity of the client corporation, percentage of blue-collar workers, loss history, health and safety policy, and average age of work force. A client corporation records its response to an Information Request by marking the box next to each line item. Note that Load Factors may or may not be included in the Information Request sent to a client corporation.

A client corporation activities may include manufacturing such that it has employees working on assembly lines in factories. This may be considered an increased risk in the number of accidental deaths or personal injuries. Thus, an insurance company may provide an increased load on the base premium of an insurance product with assistance services. In the exemplary response to information request shown in Table 2, a client engaging in manufacturing activities corresponds to a load factor of 1.1 that is multiplied to the Base Premium. The rest of the line items in Table 2 are more exemplary information requests to assist an insurance company to assess the additional risk of providing the client corporation an insurance product with assistance services. The load for each line item is determined using an actuarial and heuristic analysis of historical data of accident frequency, severity, and workplace conditions.

TABLE 2

RESPONSE TO INFORMATION REQUEST

Activity of Client Corporation - Select Any of the Following

| Activity | Load |
|---|---|
| Manufacturing ■ | 1.1 |
| Service Industry ☐ | 1.05 |
| Financial Difficulty ■ | 1.2 |

Percentage of Blue Collar Workers - Select Any of the Following

| Percentage | Load |
|---|---|
| 0% 25% ☐ | 1.0 |
| 25%-50% ■ | 1.1 |
| 50%-75% ☐ | 1.25 |
| 75%-100% ☐ | 1.5 |

Loss History - Select Any of the Following

| Loss History | Load |
|---|---|
| 12 > Number of ADPI > 8 ■ | 1.25 |
| Number of ADPI > 12 ☐ | 1.5 |
| 10 > Number of Court Cases won by Employees > 5 ☐ | 1.25 |
| Number of Court Cases won by Employee > 10 ☐ | 1.5 |

Health and Safety Policy - Select Any of the Following

| Policy | Load |
|---|---|
| No Policy ☐ | 1.2 |
| Written Policy ☐ | 1.0 |
| Employees tested on Written Policy ■ | 0.9 |

Average Age of Work Force - Select any of the following

| Average Age of Work Force over 45 | Load |
|---|---|
| 0% 25% ■ | 1.0 |
| 25%-50% ■ | 1.1 |
| 50%-75% ☐ | 1.25 |
| 75%-100% ☐ | 1.5 |

EXAMPLE 4

Example 4 demonstrates an analysis of the Responses to the Information Requests to calculate an adjusted base premium for the insurance product. The client responded to each line item of the information request by marking the adjacent rectangular box. Thus, in Example 4, as shown in Table 3, a client corporation's activities include manufacturing as well as being in financial difficulty. Further, 25%-50% of a client corporation's workforce comprises of blue-collar workers. In addition, a client corporation's loss history is shown to be between eight and twelve ADPI incidents per year. Also, 25%-50% of a client corporation's workforce is over the age of 45. An underwriter may then multiply the base premium by the load of each response to obtain the Adjusted Premium. In Table 3, the analysis of the responses to the information requests results in increasing the base premium from $156 to an adjusted premium of $280.31 per employee of the client corporation.

TABLE 3

ANALYSIS OF RESPONSES TO INFORMATION REQUEST

| Activity of Client Corporation | |
| --- | --- |
| Activity | Load |
| Manufacturing ■ | 1.1 |
| Financial Difficulty ■ | 1.2 |

| Percentage of Blue Collar Workers | |
| --- | --- |
| Percentage | Load |
| 25%-50% ■ | 1.1 |

| Loss History | |
| --- | --- |
| Loss History | Load |
| 12 > Number of ADPI > 8 ■ | 1.25 |

| Health and Safety Policy | |
| --- | --- |
| Policy | Load |
| Employees tested on Written Policy ■ | 0.9 |

| Average Age of Work Force | |
| --- | --- |
| Average Age of Work Force over 45 | Load |
| 25%-50% ■ | 1.1 |
| Base Premium | $156 |
| Adjusted Premium | $280.31 |

EXAMPLE 5

Example 5 demonstrates the use of an exemplary spreadsheet application (Table 4) that may be used during the underwriting process for insuring a client corporation's employees as well as its visitors. Table 4 shows that the client corporation has 6,546 sites it would like to be insured for ADPI with assistance services. The average number of visitors per site for the exemplary client corporation is 50. An insurance company provides coverage of $46,000 (i.e. sum insured or SI) for each accidental death or personal injury victim. However, an insurance company limits its coverage to $12,000,000 aggregate per event. Consequently, a loss event that claims 1,000 ADPI victims without an aggregate limit would pay $46,000,000 in claims (i.e. 1,000 victims×$46,000 SI). However, the aggregate limit allows an insurance company to pay only $12,000,000 or $12,000 per ADPI victim (i.e. $12,000,000 aggregate limit/1,000 victims).

Table 4 further illustrates two options of an insurance product that insures ADPI with assistance services. Option 1 allows an insurance company to insure a client corporation against ADPI due to terrorist attacks and violent crime. Option 2 provides insurance for ADPI against terrorist attacks, violent crime, and fire and collapse. Continuing with the example shown in Table 4, the rate of AD and PI for this client corporation is determined to be 0.0008624% and 0.00010053%, respectively, due to terrorist attack and violent crime. Calculation of these rates will be explained when discussing Example 6 (Table 5). The premium per site is calculated by multiplying the sum insured ($46,000) by each rate and then by a Target Loss Ratio equal to 50%. The total premium is found by multiplying the premium per site by the total number of sites. The premium may be adjusted with different loads that take into account different risk factors specific to a particular client. For example, the client corporation may want to insure additional employees, increase the aggregate limit, insure an iconic location (e.g., popular national chain restaurants are iconic locations and may be targeted for terrorist attacks), insure for any collateral damage, and want an insurance product with assistance services such as psychological counselling, physical therapy, and crisis management.

EXAMPLE 6

Example 6 demonstrates the calculation of the frequency rate of loss events shown in Option 1 and Option 2 in Example 5 (Table 4). The loss events for Option 1 in Example 5 are AD and PI due to terrorism and violent crime. The loss events for Option 2 in Example 5 are ADPI due to terrorism and violent crime as well as fire and collapse.

Example 6 (Table 5) finds the rate of terrorism by analyzing statistical data of terrorist attacks worldwide and by country. The frequency rate is calculated and then the commercial rate. An insurance company may give a discount to particular client corporation if it considers it less risky than an average client corporation. The rate of violent crime is calculated by gathering and analyzing national crime statistics to determine the frequency of crime related deaths and injuries. The total rate used in Option 1 of Example 5 is the sum of the Terrorism Rate and the Violent Crime Rate found in Table 5 of Example 6.

Option 2 in Example 5 (Table 4) includes ADPI insurance coverage for Fire and Collapse in addition to Terrorism and Violent Crime. Example 6 (Table 5) shows how the rate of Fire and Collapse is calculated. National fire statistics are gathered and analyzed. Frequency and commercial rates are assessed and discounts are given to particular client corporations that pose less of a risk than average. An additional load is multiplied by the rate to take into account building collapse during a fire. The rate of fire, terrorism, and violent crime are added to give the total rate for Option 2 in Example 5 (Table 4).

TABLE 4

ADPI Insurance with Assistance Services

| | | | |
|---|---|---|---|
| Underwriter | | Broker Commission | |
| Referred Date | | | |
| Policyholder | | | |
| Address | | | |
| Activity | | | |
| Average Number of Visitors | 50 | Number of Sites | 6,546 |
| SI AD | $46,000 | Aggregate Limit | $12,000,000 |
| SI PI | $46,000 | TLR | 50% |

| | SI | Rate Option 1 | Premium per site | Total Premium |
|---|---|---|---|---|
| OPTION 1 | | | | |
| Accidental Death | $46,000 | 0.00086824% | 20.0 | $130,721 |
| Personal Injury | $46,000 | 0.00100533% | 23.1 | $151,360 |
| | | | | $282,082 |
| Load to insure employees | | | | |
| Load Aggregate | | | | |
| Load Iconic Location or Company | | | | |
| Load assistance services | | | | |
| TOTAL PREMIUM | | | | |
| OPTION 2 | | | | |
| Accidental Death | $46,000 | 0.00133546% | 30.7 | $201,064 |
| Personal Injury | $46,000 | 0.00143145% | 32.9 | $215,517 |
| | | | | $416,581 |
| Load to insure employees | | | | |
| Load Aggregate | | | | |
| Load Iconic Location or Company | | | | |
| Load Assistance Services | | | | |
| Load Collateral Damage | | | | |
| TOTAL PREMIUM | | | | |

TABLE 5

RATES EXPLAINED

TERRORISM
http://www.tkb.org/Home.jsp

| Terrorism Worldwide | Fatalities | Injuries |
|---|---|---|
| average frequency 2000-2005 w/o Iraq | 1,926 | 5,616 |
| WW population | 6,498,142,000 | 6,498,142,000 |
| Frequency rates | 0.000030% | 0.000086% |
| Commercial Rates | 0.000059% | 0.000173% |
| Discount | | 80% |
| | | 0.0000346% |

TABLE 5-continued

RATES EXPLAINED

VIOLENT CRIME
http://www.fbi.gov/ucr/cius_04/documents/CIUS_2004_Section2.pdf

| U.S. Statistics | Fatalities |
|---|---|
| Violent crime | 15,067 |
| US Population | 298,000,000 |
| Frequency rates | 0.0050560% |
| Commercial rates | 0.0101% |
| Discount for safer countries | 60% |
| Discount for "on premises" only | 80% |

| ADPI Option 1 | Terrorism Rate | Violent crime Rate | TOTAL RATE |
|---|---|---|---|
| AD | 0.000059% | 0.000809% | 0.000868% |
| PI | 0.000035% | 0.000971% | 0.001005% |

FIRE COLLAPSE, ETC.

| US STATS Fire 2004 | Fatalities | Injuries |
|---|---|---|
| | 3,900 | 17,785 |
| non domestic fire | 17% | 17% |
| # | 663 | 3,023 |
| Frequency rates | 0.000222% | 0.001015% |
| Commercial rates | 0.000445% | 0.002029% |
| Discount | | 80% |

| ADPI Option 2 | Fire Rate | Load Explosion Collapse | Plus Rate ADPI Option 1 | TOTAL RATE |
|---|---|---|---|---|
| AD | 0.000445% | 0.0004672% | 0.000868% | 0.0013355% |
| PI | 0.000406% | 0.0004261% | 0.001005% | 0.0014315% |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of providing a combined insurance and assistance product to an insured, the method comprising:
   providing insurance coverage to the insured for at least one insured loss event;
   in combination with providing insurance coverage, providing assistance services coverage to the insured based upon the at least one insured loss event; and
   calculating a base premium for the combined insurance and assistance product using a computer to execute computer executable instructions stored on a tangible computer-readable medium, the base premium based at least in part on the sum of a calculated premium for the insurance coverage and a calculated premium for the assistance services coverage.

2. The method according to claim 1, wherein the insurance coverage includes personal injury coverage.

3. The method according to claim 1, wherein the insurance coverage includes property damage coverage.

4. The method according to claim 1, wherein the assistance services coverage includes preventive services directed to helping avoid the occurrence of at least one insured loss event.

5. The method according to claim 4, wherein the assistance services coverage includes rehabilitative services directed to providing assistance after an occurrence of at least one insured loss event.

6. The method according to claim 5, wherein the assistance services coverage is selected from the group consisting of psychological counseling, physical therapy, crisis management, corporate image enhancement, accident investigation, media management, human resource services, stress management, job training, job placement, and valet services.

7. The method according to claim 1, wherein the assistance services coverage includes rehabilitative services directed to providing assistance after an occurrence of at least one insured loss event.

8. The method according to claim 1, further comprising:
   providing the covered assistance services to the insured in response to the occurrence of a triggering event.

9. The method according to claim 8, wherein the triggering event comprises a predetermined date.

10. The method according to claim 9, wherein the triggering event occurs on a predetermined, periodic basis.

11. The method according to claim 8, wherein the triggering event is the occurrence of the insured loss event.

12. The method according to claim 1, further comprising:
    determining a target loss ratio for the insurance coverage;
    wherein calculating the base premium includes using the target loss ratio to calculate the premium for the insurance coverage.

13. The method according to claim 1, wherein calculating the base premium includes using statistical information on frequency and severity of at least one insured loss event to calculate the premium for the insurance coverage.

14. The method according to claim 1, further comprising:
    providing the insured a set of information requests based upon the insurance coverage and assistance services coverage to be provided;
    receiving information from the insured in response to the information requests;
    performing an underwriting process using actuarial and heuristic methodologies that are implemented using a computer to execute computer executable instructions stored on a tangible computer-readable medium wherein information received from the insured in response to the information requests is utilized; and
    adjusting the base premium based on the underwriting process.

15. The method according to claim 1, wherein calculating the base premium includes determining the average cost for the covered assistance services based upon statistical information to calculate the premium for the assistance services coverage.

16. The method according to claim 1, the method further comprising:
    determining a load factor based on information received from the insured in response to the information requests;
    determining an adjusted premium that is based upon the product of the base premium and the load factor.

17. A system for providing a combined insurance and assistance product to an insured that provides insurance coverage to the insured for at least one insured loss event and assistance service coverage to the insured based upon the at least one insured loss event, the system comprising:
    at least one database that stores product data comprising at least one of statistical data concerning the frequency of at least one insured loss event, the cost associated with providing at least a portion of the assistance service coverage, information requests sent to the insured, bibliographic information concerning the insured, and payment history of the insured;
    a tangible computer-readable medium storing at least one software application for calculating a base premium for the combined insurance and assistance product which is based at least in part on the sum of a calculated premium for the insurance coverage and a calculated premium for the assistance services coverage;
    at least one server that operates the at least one software application for calculating the base premium;
    at least one communication network providing communication between the at least one database that stores product data, the at least one software application for calculating the base premium, and the at least one server that operates the at least one software application for calculating the base premium; and
    at least one electronic user interface to access the at least one software application for calculating a base premium and the at least one database that stores product data.

* * * * *